Patented June 16, 1942

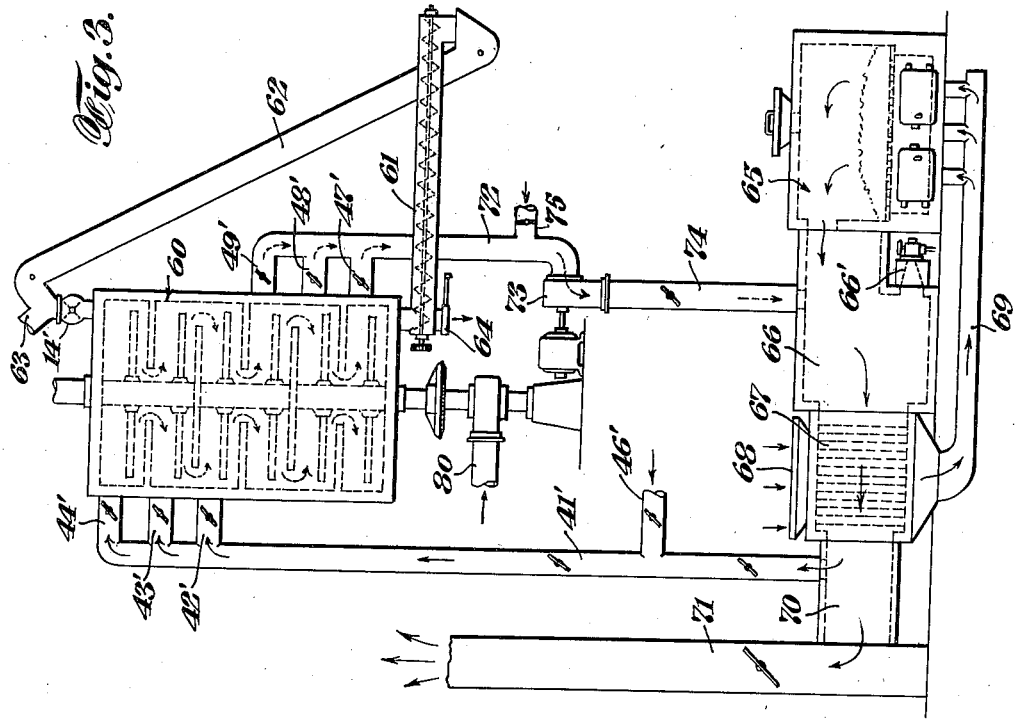

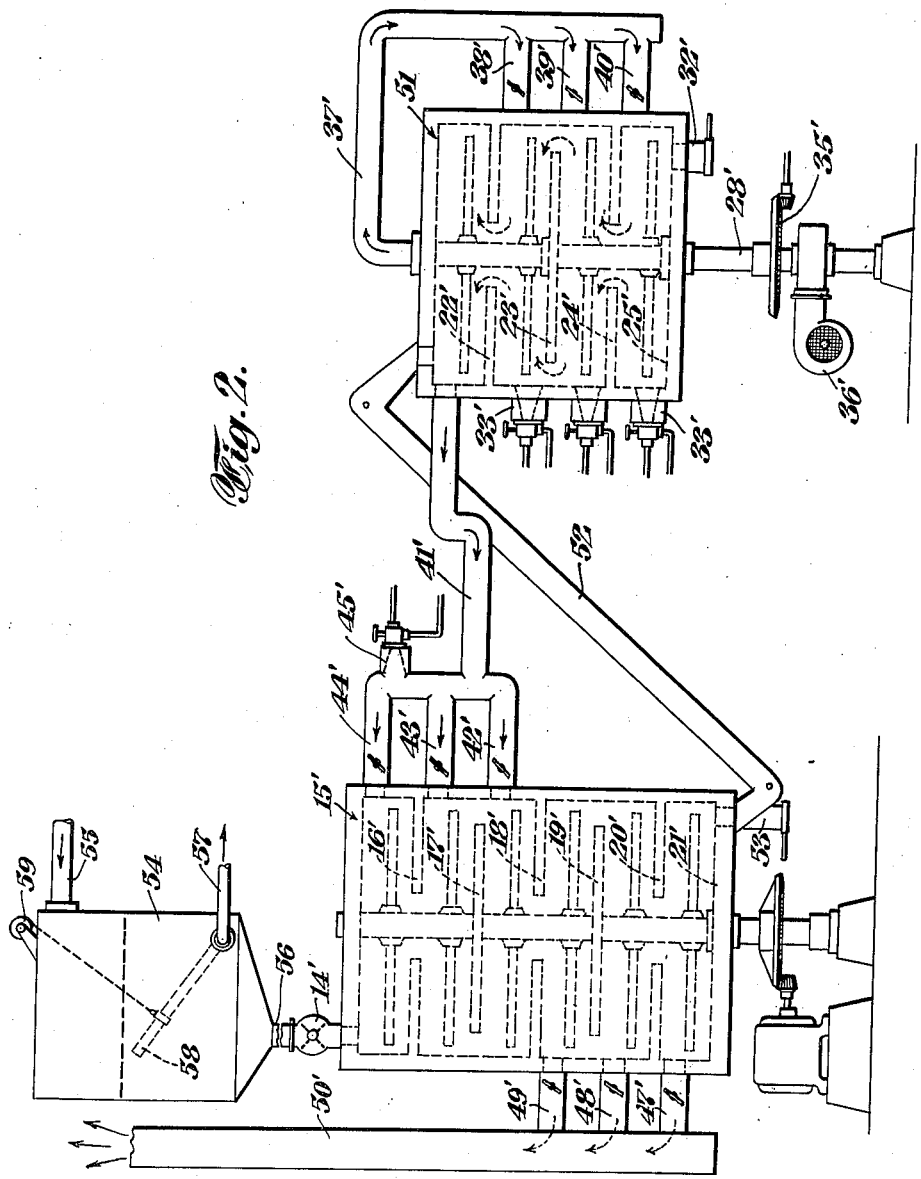

2,286,309

UNITED STATES PATENT OFFICE 2,286,309

METHOD AND APPARATUS FOR DRYING AND INCINERATING WASTE MATERIALS OF HIGH MOISTURE CONTENT

Robert W. Rowen, New York, N. Y., assignor to Nichols Engineering & Research Corporation, New York, N. Y., a corporation of Delaware Application May 2, 1940, Serial No. 332,900

5 Claims. (Cl. 110—12)

This invention relates to methods and apparatus for drying and also for incinerating waste materials, more particularly materials such as sewage sludge in liquid condition or having a particularly high moisture content. The sludge to be treated according to the invention may also be mixed with other waste materials such as ground garbage for example. Also according to certain examples of the invention, apparatus and methods may be provided for simultaneously incinerating other and more highly combustible waste material such as refuse and trash, and utilizing the resulting heat for drying or burning the sewage sludge.

This invention provides certain alternative and improved methods and arrangements of the general type disclosed in U. S. Patent No. 2,015,050 to Dudley Baird and Robert W. Rowen, reference to which is hereby made. While the invention of said patent has gone into wide and successful use, yet in some cities the problems of disposal of municipal waste are such that substantial savings could be effected if the sewage sludge were dried or dried and incinerated by starting the drying process with the sludge still in liquid condition. For some time it has been appreciated that this would make it possible to avoid the preliminary filtering of the sludge for forming a filter cake adapted to be received by the drying and burning furnace. The filtering of sewage sludge is an expensive and sometimes quite troublesome step, not only because of the original cost of the filtering apparatus but also because of the costs of power and of the chemicals used in filtering, the renewal of filter cloths and other maintenance expenses. Yet so far as is known, the problem of directly drying liquid sewage sludge without a prohibitive fuel expense or production of obnoxious odors, has heretofore remained unsolved.

For drying and burning moist sewage sludge filter cake, numerous ways have been tried of circulating the gases, vapor and air over the various hearths of furnaces of the general type disclosed in the above mentioned patent, but none of these arrangements has proven adaptable in practice to the treatment of liquid sludge without evolving foul odors or incurring prohibitive fuel expense. For example, if a multiple hearth furnace of the general type shown in the above mentioned patent is used for treating liquid sludge, and if the gases travel from the bottom to the top of the furnace countercurrent to the movement of both the burning and drying sludge, then the hot gases from the burning sludge will rise into contact with partially dried sludge and cause smoldering or partial scorching thereof, thus producing obnoxious gases. These foul gases then contact with the cooler hearths bearing the wet sludge, with the result that sometimes combustion of the obnoxious gases will be smothered in the moist atmosphere on the upper hearths and the foul gases will be discharged from the furnace without opportunity for deodorizing heat treatment. On the other hand, if the gases are made to travel co-current with the sludge, both over the drying hearths and the burning hearths in succession, then an excessive amount of extraneous fuel will have to be used in the upper burning hearths in order to first completely dry the partially dried sludge at this point, and in order to raise the temperature of the evaporated moisture and other gases at this point sufficiently to maintain combustion. Furthermore, with such down-draft operation of the burning hearths, the discharge of the hot gases from the lower burning hearths will involve a serious heat loss.

Also with the prior multiple hearth arrangements for treating sewage sludge, it has not proven economically feasible to so dry the sludge that same may be removed from the furnace before burning, for use for example as fertilizer material if desired. Furthermore, various attempts to improve the economical operation of wet sludge drying equipment have involved the use of recuperators, which are expensive to install and maintain.

According to the present invention the above noted difficulties have been overcome by drying the waste material by passing same through succeeding drying zones co-current with a stream of hot gases introduced at high temperature to the first zone and thence traveling at decreasing temperatures along with the drying material and finally discharging the gas stream and evaporated moisture from the zone or zones where the material is driest, at comparatively low temperature. These drying zones may comprise the superimposed hearth spaces of a multiple hearth furnace or in some cases if desired, the furnace may be of a spray or flash drier type. As a source of this co-current stream of hot gases, either a multiple hearth countercurrent sludge incinerator or a refuse and trash incinerator may be used. In either case the incinerator should be isolated against the passage of fire or direct passage of high temperature gases into the lower sludge drying zones, so that burning or scorching of the drying sludge is avoided with a consequent avoidance of obnoxious odors in such zones, and so as to leave the dried sludge in condition unimpaired for fertilizer use, etc., if desired. With these arrangements, gases of very high temperature which have been previously fully deodorized in connection with the incinerator, may be applied directly to the incoming liquid or wet sludge for quickly initiating the drying action in the upper drying zones but without danger of burning the sludge at this point in view of its liquid or wet condition. Then the gases traveling co-current will decrease in temperature as the sludge becomes drier, thus continuing to avoid scorching and consequent foul odors. In the final drying zones where the sludge would normally be self-combustible, combustion and odors are avoided due to the comparatively low temperature of the gases at this point and the heavy moisture content thereof. Consequently such gases and the evaporated moisture therewith may be discharged from the lower drying zones directly to the atmosphere without any troublesome odors and without any serious loss of heat.

Various further and more specific objects, features and advantages will clearly appear from the detailed description given below taken in connection with the accompanying drawings which form a part of this specification and illustrate merely by way of example preferred forms of the apparatus of the invention.

The invention consists in such novel features, arrangements and combinations of parts as may be shown and described in connection with the apparatus herein disclosed, and also such novel methods and combinations of method steps as are disclosed and described herein.

In the drawings,

Fig. 1 is a diagrammatic view of a drying and incinerating furnace of the multiple hearth type.

Fig. 2 is a diagrammatic view of a construction comprising one embodiment of the invention wherein the drying and burning furnaces comprise separate multiple hearth units.

Fig. 3 is a diagrammatic view of a preferred embodiment of the invention with a drying furnace of a multiple hearth type used in conjunction with a refuse incinerator of a grate type.

Raw primary sewage sludge may contain from about 90-97% moisture, and digested primary sludge from about 88-95%. Raw activated sludge may contain from about 97-99% moisture, and digested activated sludge from about 93-97%. Before it is attempted to dry or burn such liquid sludges, it is desirable to concentrate the same at least to some extent. The various available concentrating methods include the use of decantation tanks, so-called "picket fence" and "cone type" concentrators, centrifuges, heating and concentrating by decantation, and the use of chemicals either as flotation agents or flocculating settling agents. By these methods from 2 to 5% or more of the moisture may be removed without difficulty or much expense. In connection with Fig. 1 there is indicated a cone type concentrator for thickening the liquid sludge, having an inlet 10, cones 11, decanted liquid outlets 12 and thickened sludge outlet 13. The thickened sludge may be continuously or substantially continuously conveyed as through a suitable sealed feeding device 14 into the top of a multiple hearth furnace 15.

This furnace may have a plurality of drying hearths as at 16 to 21 and a plurality of burning hearths as at 22 to 25. Accompanying each hearth, a plurality of rabble arms as at 26, 27 may be provided and mounted on a rotating central shaft as at 28, for periodically agitating and gradually advancing the sludge material in succession over each hearth, and whereby the sludge drops downwardly from hearth to hearth through central and peripheral hearth discharge openings in a manner similar to the passage of the material through the furnace of the above mentioned Patent 2,015,050. However, if the introduced sludge is in liquid form, it will distribute itself as a relatively thin layer of liquid over the upper hearth upon which it will be periodically stirred and advanced by the rabble arm teeth. And on about the second hearth, the liquid will be sufficiently thickened so that its movement will be partially by flowing and partially by rabbling, that is, after each passage of the rabble teeth through a thin layer of material, its surface will have crests and valleys affording exposure to an extended surface area to the drying gases. On the succeeding hearths as the sludge becomes drier and somewhat plastic, the frequent periodic agitation by the rabble teeth will keep it from forming into encrusted cakes or large masses. And if the drying action is prolonged, or continued on a rather large number of hearths, the final dried material will be finely divided, free from burned or scorched portions, and of a substantially uniform dryness.

At the bottom drying hearth, 21 for example, the discharge ports may be provided with sealed feeding means for effectively isolating the lower burning hearths against passage of fire or direct passage of hot gases from the burning zones into the lower drying zones. Various forms of sealed feeding means adaptable for such purpose are known in the art and as here shown for example, may comprise a shelf as at 29 on which the material falls in a pile, closing the hearth discharge port. The rabble arms as at 30 at the upper burning hearths may be equipped with scraping arms as at 31 so that when such arms rotate, the scraping arms will periodically remove a certain amount of material from the shelves 29 and thus provide for feeding the solids from the drying hearth discharge ports onto the upper burning hearth.

On the burning hearths as at 22 and 25, the treatment of the material is quite similar to the treatment effected in the middle and lower hearths of the furnace of the above mentioned Patent 2,015,050. However, since the material may be dry enough to support combustion as it falls upon the first burning hearth, its incineration may start immediately without any substantial intermediate period of smoldering or scorching of the exterior of the particles and thus with less possibility for the evolution of obnoxious gases. With the gases passing countercurrent to the material on the burning hearths, once ignition of the sludge on the lower hearths is started, the ascending hot gases and products of combustion from the burning sludge on the lower burning hearths will serve to quickly ignite the partially dried sludge on the upper burning hearths. The ash remaining after the organic matter is burned out of the sludge in the incineration zones, may be discharged as through a suitably sealed bottom outlet 32.

Sufficient heat to insure proper burning temperatures at the burning hearths may be provided by burning oil, digestor gas, powdered coal or other fuel at these zones. In the example as shown, severed oil burners are indicated as at 33 for this purpose.

Except as otherwise noted, the constructional details for the multiple hearth furnace per se, may be the same or similar to those of the above mentioned patent. The lower furnace walls and the burning hearths at least, are preferably made of or lined with fire-resistant brick or equivalent material, although the drying hearths and upper wall portions of the furnace if desired may be made less expensively of steel without lining material.

It will be understood that all of the rabble arms may be provided with rabble teeth directed at proper angles to advance the material inwardly and outwardly respectively of alternate hearths, and the central shaft 28 may be rotated as by a motor 34 and gearing 35. The central shaft and rabble arms may be formed with cooling air conduits of types well known in the art of multiple hearth furnaces, and the air therefor may be supplied as from a blower 36 at the base of the furnace. After passage through the rabbling structure, the cooling air will become heated to a substantial extent and may be conducted as by a duct 37 from the upper end of the central shaft down to inlet ducts 38, 39, 40 provided with suitable adjustable dampers as shown for admitting variable quantities of the preheated air onto each of the burning hearths. This air may for example be at temperatures of about 200°–500° F., and will pass in general countercurrent to the movement of the burning material and such air together with the evolved gaseous products of combustion will be further heated to the extent necessary by the burners 33, so that the dried sludge will not only be rapidly incinerated but the gas will be raised to temperatuers of from 1000°–1600° F., or sufficient to decompose and thus deodorize any obnoxious gases as formed.

From the upper burning hearth 22 the remaining air together with the hot gaseous products of combustion may be conducted as by duct 41 up to inlets as at 42, 43, 44, provided with suitable adjustable dampers as shown for admitting variable quantities of such hot gas into the presence of the liquid or wet sludge on the upper drying hearths. If the gas mixture in the duct 41 is of a temperature too low to provide enough heat to rapidly dry the sludge, a gas or oil burner as at 45 may be provided, preferably at a lower portion of the duct 41. On the other hand, if it is found that the temperatures in the duct 41 are too high and such as to possibly cause scorching or smoldering of the sludge at any of the drying hearths, then air may be admitted to the duct 41 through an inlet as at 46 provided with an adjustable damper.

The hot gases and air thus admitted into the presence of the material on the upper drying hearths may be within the temperature range of about 900°–1600° F., preferably about 1100° F. for example. However, since the sludge is in a liquid state or very wet on these upper hearths, these high temperatures will not cause it to smolder or be scorched and consequently foul odors will not be here evolved. On the other hand, these high temperatures will insure rapid and effective evaporation of moisture and the hot gases and moisture are then conducted, in general co-current with the flow of drying material, over the succeeding lower drying hearths and downwardly from hearth to hearth at substantially decreasing temperatures. Thus as the material becomes drier, the gas temperatures are in general correspondingly lower and scorching and smoldering, and consequent odors are still avoided.

Finally at the lower drying hearth or hearths the gases and evolved moisture may be discharged through ducts as at 47, 48, 49 opening into a stack 50 through adjustable dampers as shown. The gases thus discharged are preferably within a temperature range of about 160°–350° F., or preferably about 200° F. and above the dew point at the lower drying hearths. These temperatures are so low, particularly with the moist gases present, that the partially dried sludge in the lower drying hearths, which may be in a somewhat plastic state, is safe from smoldering or scorching. At the same time these relatively low temperatures avoid any substantial loss of heat from the process by way of the discharged gases. Depending upon the temperatures to which the gases in the duct 41 are adjusted and the number and area of the drying hearths, the drying action may be carried to the extent desired, for example within a wide range of from 30–70% moisture. If the dried sludge is to be immediately burned as for example in the burning zones of the furnace of Fig. 1, it will be satisfactory if the sludge is dried to a 50% moisture content as it leaves hearth 21. At this point the dried material may have a temperature for example as low as 150° F. In fact, the sludge need not be raised in temperature at any point in the drying zones substantially above this figure, since in the upper drying zones reliance is placed on the wet or liquid nature of the sludge to prevent its overheating by the hot gases, and in the lower drying zones reliance is placed principally on the lower gas temperatures to prevent overheating or scorching.

With the above described arrangement the liquid or wet sewage sludge or mixed sludge and ground garbage may be readily dried and burned even though the moisture content may be anywhere within the range of about 70–97% water. Ordinarily material of a moisture content of 90% may be thus satisfactorily disposed of.

In cases where it is desired to use the dried sludge or sludge-garbage mixture without burning same, as a fertilizer for example, the above described burning hearths may be omitted and hot gases for the drying action may be obtained by the use of fuel burners as in the inlet pipe 41 or by using the heat of waste hot gases from a boiler or other source, as from a refuse or trash incinerator, as hereinafter described in connection with Fig. 3.

In some plants where it may be inconvenient to install a tall furnace with the requisite number of both drying and burning hearths, the burning hearths may be enclosed as a separate unit 51 as shown in Fig. 2. In this case a suitable conveyor 52 may be provided for conducting the dried sludge from the lower drying hearth into the top of the burning furnace. As indicated at the base of the conveyor 52 a discharge opening 53 may be provided if desired to withdraw part of the dried sludge. If this is to be used locally for fertilizer purposes, for example, the equipment should preferably be so operated that the sludge or sludge-garbage mixture will be dried to a moisture content in the neighborhood of 30% or less.

With the arrangement of Fig. 2, it is of course necessary to provide cooling air conduits only in the rabbling structure of the incinerating unit 51, but as shown the connections may be otherwise similar to those of Fig. 1, corresponding parts being identified by the same numerals accompanied by prime marks.

The two-unit arrangement of Fig. 2 has the further advantage that if desired the rotating rabbling structure of the drying unit may be operated at a speed independently of and different from that of the burning unit, by using separate motors on the central shafts of the two units respectively.

At the inlet of the drying unit in Fig. 2 in lieu of the cone type concentrator of Fig. 1, there is shown a typical decanting tank 54 having an inlet 55 and thickened sludge outlet 56, and a decantation draw-off pipe 57. As shown, an inlet 58 of the decantation pipe may be adjusted to various elevations as by a cord and pulley 59, to draw off the partly clear liquid at a level where it is cleanest. Various types of known decantation tanks or concentrators may be used interchangeably with the arrangements of both Figs. 1 and 2.

The moisture contents, temperatures, etc., as preferred with operation of the arrangement of Fig. 2 may be the same or similar to those mentioned above in connection with Fig. 1.

In Fig. 3 a drying furnace 60 is shown which may be generally similar per se to the drying furnace 15' of Fig. 2. In this case a screw conveyor 61 may be connected to the dried sludge discharge outlet for conducting a part of the dried sludge if desired to an elevator 62, and thence again into the furnace inlet 14' with the sludge being initially introduced through pipe 63. With this arrangement a desired portion of the sludge may be in effect recirculated through the drier for more complete and thorough drying. For instance, if it is desired to use the dried sludge or sludge-garbage mixture for shipment to a distant point, it may be advisable, to save transportation charges, to reduce the moisture content down to in the neighborhood of 10% or even less. On the other hand, if the dried sludge is to be used locally for fertilizer purposes, it need only be dried to in the neighborhood of 30% as above indicated. In either event, desired portions may be withdrawn through a suitable outlet port as at 64.

With the arrangement of Fig. 3, the hot gases entering the upper drying zones through conduit 41' may be obtained from a refuse or trash incinerator such as shown at 65. This incinerator may be associated with a combustion chamber as at 66 having a fuel burner as at 66', and in which chamber the temperatures may be within the range of 1100–1700° F. for example. From this chamber the hot gases may pass through a preheater 67 for heating air entering at 68 and passing through conduit 69 into the ash pit of the incinerator. The gaseous products of combustion from the incinerator after passing through the preheater may be conducted through an expansion chamber as at 70 and thence to a stack as at 71. A portion of the gases from the expansion chamber may as indicated be conducted into the conduit 41' for introduction into the upper drying hearths. In case these gases are too hot, air may be admitted through inlet 46' as in the case of Fig. 1.

While the gases discharged from the outlets 47', 48', 49' of drying furnace 60 may be allowed to escape directly to the atmosphere if the drying action is not carried to an extensive degree, or if the introduced sludge is particularly wet or liquid, yet in cases where sewage sludge filter cake is used in the furnace 60 and in cases where the drying is carried down to a low moisture content, there may be some danger of scorching with consequent odors. Hence with this arrangement a discharge pipe may be provided as at 72, and a blower 73 communicating through pipe 74 with the incinerator combustion chamber 66. Thus the gases from the lower drying zones may if necessary be readily heat-treated and consequently deodorized in the combustion chamber, and finally discharged with the incinerator gases through the stack 71.

The arrangement of Fig. 3 is particularly adapted for the treatment of sewage sludge obtained from drying beds and embodying for example about 60% moisture, and when this sludge is introduced with partially dried sludge from the conveyor 62, the mixture may average for example about 40–50% moisture. With this amount of moisture the sludge is readily kept in a free and open condition during drying. And under these conditions the waste gases introduced through conduit 41' may preferably have a temperature within the range of about 800–1200° F., whereas the gases in the discharge conduit 72 may have a temperature of from 160–500° F. The arrangement of Fig. 3 is particularly adaptable for use with a variety of different sludges and waste materials. For instance the introduced sludge may come from dewatering machines, vacuum filters, or centrifuges, as well as drying beds or decantation apparatus. And the resulting dried product may be widely varied in moisture content if desired, from about 0 to 20% or higher. Also by closing the dampers in pipes 42', 43' with the damper in pipe 44' open and with the blower 73 shut off, the furnace 60 may be operated as a drier and incinerator for the sludge or sludge-garbage mixtures. The damper in pipe 74 would then be closed and air for combustion purposes admitted by opening a damper in an air inlet 75, whereby air and gases travel countercurrent to the material up through the furnace and down through pipe 41' to chamber 70 and stack 71. In this event the conveyor and elevator 61, 62 need not be used. When the furnace 60 is thus used as an incinerator, the rabbling arms and shafts should be air cooled as by air admitted through pipe 80.

While the invention has been described in detail with respect to particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent of the United States is:

1. The method of drying sewage sludge of high moisture content and simultaneously burning readily combustible refuse, which comprises continuously introducing the wet sludge into a drying zone, thence through a plurality of succeeding drying zones and downwardly from zone to zone until the sludge is dry enough to be normally self-combustible if ignited, burning the refuse in a separate enclosure isolated against passage of fire or direct passage of gases to the lower drying zones, effecting the sludge drying action by conducting hot gaseous products of combustion from said enclosure into the presence of the wet sludge in the upper zone or zones and thence along co-current with the drying sludge and at decreasing temperatures, and conducting such gaseous products with the evaporated moisture from the lower drying zone or zones into said hot gaseous products of combustion at a point prior to the introduction of said products of combustion into the presence of the wet sludge, to substantially eliminate any obnoxious odors in the gases evolved from the drying sludge.

2. The method of drying sewage sludge of high moisture content and simultaneously burning readily combustible refuse, which comprises continuously introducing the wet sludge into a drying zone, thence through a plurality of succeeding drying zones, then reintroducing at least a part of the sludge for repeated passage through one or more of said zones, whereby the sludge is finally sufficiently dry to be readily combustible if ignited, burning the refuse in a separate enclosure isolated against passage of fire or direct passage of gases to the lower drying zones, effecting the sludge drying action by conducting hot gaseous products of combustion from said enclosure into the presence of the wet sludge in the upper zone or zones and thence along co-current with the drying sludge and at decreasing temperatures, and discharging such gaseous products with the evaporated moisture from the lower drying zones at temperatures insufficient to cause burning of the drying sludge.

3. Furnace apparatus for drying sewage sludge of high moisture content, with the aid of heat from burning refuse, comprising a plurality of enclosed superimposed drying hearths, means for introducing the material onto the upper hearth and for periodically agitating and gradually advancing same over each hearth and downwardly from hearth to hearth, a separately enclosed refuse incinerator, and means for conducting a stream of hot gaseous products of combustion therefrom into the space over the upper drying hearth or hearths and thence co-current with the drying material, and means for discharging said stream with the evaporated moisture from the lower drying hearth or hearths.

4. Furnace apparatus for drying sewage sludge of high moisture content, with the aid of heat from burning refuse, comprising a plurality of enclosed superimposed drying hearths, means for introducing the material onto the upper hearth and for periodically agitating and gradually advancing same over each hearth and downwardly from hearth to hearth, a separately enclosed refuse incinerator having a gas combustion chamber, and means for conducting a stream of hot gaseous products of combustion from such chamber into the space over the upper drying hearth or hearths and thence co-current with the drying material, and means for discharging said stream with the evaporated moisture from the lower drying hearth or hearths into said incinerator.

5. Furnace apparatus for drying sewage sludge of high moisture content, with the aid of heat from burning refuse, comprising a plurality of enclosed superimposed drying hearths, means for introducing the material onto the upper hearth and for periodically agitating and gradually advancing same over each hearth and downwardly from hearth to hearth, means for then conveying at least a part of the material from a lower drying hearth back to an upper drying hearth for further drying in admixture with the material being initially introduced, a separately enclosed refuse incinerator, and means for conducting a stream of hot gaseous products of combustion therefrom into the space over the upper drying hearth or hearths and thence co-current with the drying material and at decreasing temperatures, and means for discharging said stream with the evaporated moisture from the lower drying hearth or hearths and for conducting same to a high temperature zone at said incinerator, for destroying any obnoxious gases in same.

ROBERT W. ROWEN.